(12) United States Patent
Narita et al.

(10) Patent No.: US 7,285,337 B2
(45) Date of Patent: Oct. 23, 2007

(54) HEAT-RESISTANT NICKEL-ALLOY COMPOSITE EXCELLENT IN HIGH-TEMPERATURE OXIDATION RESISTANCE

(75) Inventors: Toshio Narita, Hokkaido (JP); Daisuke Yoshida, Hokkaido (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 10/506,537

(22) PCT Filed: Mar. 5, 2003

(86) PCT No.: PCT/JP03/02604

§ 371 (c)(1),
(2), (4) Date: Mar. 7, 2005

(87) PCT Pub. No.: WO03/074763

PCT Pub. Date: Sep. 12, 2003

(65) Prior Publication Data

US 2005/0153161 A1    Jul. 14, 2005

(30) Foreign Application Priority Data

Mar. 5, 2002  (JP) .............................. 2002-059547

(51) Int. Cl.
*B32B 15/01* (2006.01)
*B32B 15/04* (2006.01)
*B32B 15/20* (2006.01)

(52) U.S. Cl. ..................... 428/666; 428/667; 428/680

(58) Field of Classification Search ............... 428/610, 428/650, 666, 667, 680, 615

See application file for complete search history.

(56) References Cited

U.S. PATENT DOCUMENTS 3,998,603 A  *  12/1976  Rairden, III ................. 428/651

FOREIGN PATENT DOCUMENTS

GB    2-152 082    7/1985

OTHER PUBLICATIONS

Patent Abstracts of Japan, Publication No. 03-044484, dated Feb. 26, 1991. Cited in the specification.
Patent Abstracts of Japan, Publication No. 05-195188, dated Aug. 3, 1993. Cited in the specification.

(Continued)

*Primary Examiner*—Michael E. Lavilla
(74) *Attorney, Agent, or Firm*—Westerman, Hattori, Daniels & Adrian, LLP.

(57) ABSTRACT

A composite resistive to high-temperature corrosion and abnormal oxidization, maintains original excellent high-temperature characteristics of Ni alloys over a long period of time, and suitable for applications in a high-temperature such as gas turbines, jet engines, and elements for exhaust-gas systems. A heat-resistant Ni-alloy composite has excellent high-temperature oxidation resistance, including a Ni-alloy substrate that has been subjected to an Al-diffusing treatment. The surface coat has a multi-layer structure including an inner layer composed of an α-Cr phase and an outer layer composed of a β phase (Ni—Al—Cr) and a γ' phase (Ni$_3$Al(Cr)) on the substrate surface. The Al content in the outer layer is at least 20 atomic percent. The α-Cr phase functions as a diffusion-barrier layer. The outer layer retains and secures a high Al content required for self-regeneration of a defective portion of the Al$_2$O$_3$ layer damaged in an operating condition.

6 Claims, 3 Drawing Sheets

OTHER PUBLICATIONS

Patent Abstracts of Japan, Publication No. 10-183373, dated Jul. 14, 1998. Cited in the specification.
Patent Abstracts of Japan, Publication No. 2000-192258, dated Jul. 11, 2000. Cited in the specification.
Patent Abstracts of Japan, Publication No. 2001-081577, dated Mar. 27, 2001. Cited in the specification.
Patent Abstracts of Japan, Publication No. 2001-192887, dated Jul. 17, 2001. Cited in the specification.
Patent Abstracts of Japan, Publication No. 2001-295076, dated Oct. 26, 2001. Cited in the specification.
Patent Abstracts of Japan, Publication No. 2001-355081, dated Oct. 25, 2001. Cited in the specification.

* cited by examiner

HEAT-RESISTANT NICKEL-ALLOY COMPOSITE EXCELLENT IN HIGH-TEMPERATURE OXIDATION RESISTANCE

TECHNICAL FIELD

The present invention relates to heat-resistant Ni-alloy composites that exhibit excellent oxidation resistance in a severe high-temperature atmosphere and which are suitable for application in, for example, gas turbines, turbochargers, jet engines, and elements for exhaust-gas systems.

BACKGROUND ART

Heat-resistant Ti alloys such as TiAl intermetallic compounds and Ti alloys; superalloys such as Ni-based, Nb-based, Ir-based, and Re-based superalloys; carbon materials; and a variety of intermetallic compounds are used as structural materials exposed to a high-temperature atmosphere, such as turbochargers, jet engines, and gas turbines. Among them, Ni-based alloys, and Ni—Cr-based alloys such as Ni—Cr binary alloys mainly composed of Cr and Ni—Cr multicomponent alloys containing other alloying elements are applied to gas turbines, jet engines, chemical plants, and the like because of high strength and high creep resistance at high temperatures.

The high-temperature atmosphere that the heat-resistant material is exposed to may contain oxidizing or corrosive components such as oxygen, steam, and the like. When the heat-resistant material is exposed to a corrosive and high-temperature atmosphere, the heat-resistant material is easily susceptible to oxidization and high-temperature corrosion caused by reactions with the corrosive components in the atmosphere. When O, N, S, Cl, H, C, or the like in the atmosphere penetrates the heat-resistant material, internal corrosion may occur in the heat-resistant material surface, decreasing the strength of the material.

The high-temperature oxidation and high-temperature corrosion of the heat-resistant material are prevented by coating the surface of the heat-resistant material with a protective film having a high atmospheric blocking capability (for example, Patent Documents 1 to 8). A typical protective film is composed of $Al_2O_3$, which is formed on a heat-resistant material surface by diffusing Al to the surface from the base metal of the heat-resistant material in an oxidizing atmosphere, chemical vapor deposition (CVD), thermal spraying, reactive sputtering, or the like. The $Al_2O_3$ film prevents the metal components in the heat-resistant material from reacting with oxidizing agents in the atmosphere and maintains the original excellent high-temperature characteristics of the heat-resistant material.

Patent Document 1: Japanese Unexamined Patent Application Publication No. 3-44484
Patent Document 2: Japanese Unexamined Patent Application Publication No. 5-195188
Patent Document 3: Japanese Unexamined Patent Application Publication No. 10-183373
Patent Document 4: Japanese Unexamined Patent Application Publication No. 2000-192258
Patent Document 5: Japanese Unexamined Patent Application Publication No. 2001-81577
Patent Document 6: Japanese Unexamined Patent Application Publication No. 2001-192887
Patent Document 7: Japanese Unexamined Patent Application Publication No. 2001-295076
Patent Document 8: Japanese Unexamined Patent Application Publication No. 2001-355081

DISCLOSURE OF INVENTION

When an $Al_2O_3$ film is formed by diffusing Al from a base metal of a heat-resistant material to the surface, Al in the heat-resistant material surface is consumed for the formation of the film. Consequently, a layer having a low Al content (Al-poor layer) is generated in the surface layer of the heat-resistant material directly below the $Al_2O_3$ film.

The Al-poor layer cannot function as an Al source, which is necessary for forming the $Al_2O_3$ film. Therefore, when a defect such as cracking or peeling occurs in the $Al_2O_3$ film of the heat-resistant material surface, the base metal cannot supply a sufficient amount of Al, causing rapid spreading of the corrosion and oxidation of the heat-resistant material from the defective portion over the entire surface.

It is required to maintain the atmospheric blocking capability of the $Al_2O_3$ film over a long period of time. In view of a decrease in the Al content at the surface layer caused by the generation of the Al-poor layer, it is a possible solution to render the Al content in the heat-resistant material high in advance.

However, the heat-resistant material becomes embrittled with an increase in the Al content, resulting in difficulty in forging and molding forming. Some heat-resistant materials decrease their high-temperature strength when the Al content increases.

In Ni-based alloys, a multi-layered thermal barrier coating is formed, consisting of a topcoat composed of $ZrO_2$ and an undercoat composed of MCrAlY, for protecting the heat-resistant material from high-temperature corrosion. However, the $ZrO_2$ film is easily permeated by oxygen, so that the undercoat surface is readily oxidized. $Al_2O_3$ is the main oxide produced at the interface between the topcoat and the undercoat. The thick growth of the interfacial oxide results in peeling off of the $ZrO_2$ topcoat, thus damaging the function of the thermal barrier coating. The diffusion of Al from the undercoat into the substrate leads to a decrease in the atmospheric blocking capability of the thermal barrier coating. The diffusion of Al into the substrate causes the destruction of a $(\gamma+\gamma')$ phase, which is effective for high-temperature strength, and facilitates the generation of a topological closed packed phase (TCP phase), which causes a significant decrease in strength.

The inventors have found that a defective portion of a damaged $Al_2O_3$ film under a working condition can be self-regenerated and the original excellent high-temperature characteristics of a Ni-alloy can be maintained over a long period of time by forming an inner layer composed of an $\alpha$-Cr phase functioning as a diffusion-barrier layer; and forming an outer layer, on the inner layer, retaining a high content of Al required for the self-regeneration of the defective portion.

Specifically, the present invention provides a heat-resistant Ni-alloy composite having excellent high-temperature oxidation resistance, including a Ni-alloy substrate that has been subjected to Al-diffusing treatment, the Ni-alloy substrate having a surface coat having a multi-layer structure of an inner layer composed of an $\alpha$-Cr phase and an outer layer composed of a $\beta$ phase (Ni—Al—Cr) and a $\gamma'$ phase ($Ni_3Al$ (Cr)) on the substrate surface, wherein the Al content in the outer layer is at least 20 atomic percent.

The heat-resistant Ni-alloy composite according to the present invention is characterized in that the Ni-alloy substrate has a Cr-containing layer.

The heat-resistant Ni-alloy composite according to the present invention is characterized in that the Cr-containing layer includes a Ni—Cr-based alloy having a Cr content of at least 20 atomic percent.

The heat-resistant Ni-alloy composite according to the present invention is characterized in that a Ni layer or a Ni—Al layer is formed on the Cr-containing layer.

The heat-resistant Ni-alloy composite according to the present invention is characterized in that the Ni-alloy substrate includes a heat-resistant Ni-based alloy or a Ni-based superalloy.

The heat-resistant Ni-alloy composite according to the present invention is characterized in that the Ni-alloy substrate includes a Ni—Cr-based alloy having a Cr content of at least 20 atomic percent.

In the heat-resistant Ni-alloy composite according to the present invention, the surface coat having the multi-layer structure is formed on the surface of the substrate composed of the Ni alloy. The layer to become the surface coat consists of the outer layer composed of $NiAl_3$ ($+Ni_2Al_3$) and the inner layer composed of a high Al alloy phase containing Cr, Ni and alloying components formed by Al diffusing treatment (refer to FIG. 2). With high-temperature heating, the phase of the outer layer changes into a β phase (Ni—Al—Cr), then into a γ' phase ($Ni_3Al$ (Cr)), while an α-Cr phase is formed and maintained in the inner layer. When the phase of the outer layer further changes into a γ phase (Ni (Cr, Al)), the α-Cr phase disappears. This phenomenon agrees with the phase diagram for a Ni—Cr—Al system shown in FIG. 1.

In the multi-layer structure, the inner layer composed of the α-Cr phase functions as a diffusion-barrier layer. The α-Cr phase is simultaneously formed when the outer layer having a high Al content is formed by Al-diffusing treatment of a Ni—Cr-based alloy substrate composed of Cr such as a Ni—Cr binary alloy mainly composed of Cr and a Ni—Cr multicomponent alloy composed of other alloying elements, a Ni alloy substrate having a Cr-containing layer, or a substrate having a Ni layer or a Ni—Cr layer formed on the Cr-containing layer.

The Al-diffusing treatment is preferably carried out by the following two steps: At a first step, diffusion of high-activity Al is carried out at a relatively low temperature of 750° C. to 800° C. During this treatment $NiAl_3$ ($+Ni_2Al_3$) is formed in the outer layer, and an interlayer composed of Cr, Ni, and Al is formed between the outer layer and the substrate. The interlayer may contain other elements from the substrate. Then, it is preferable that heat treatment be carried out at a high temperature exceeding 850° C. During this treatment an α-Cr phase is formed in the inner layer, while a β phase (Ni—Al—Cr) is formed in the outer layer. Since the formation of the inner layer composed of the α-Cr phase and the outer layer composed of the β phase spontaneously proceeds at a high temperature, the heat treatment is not necessary when the composite is used in a high temperature.

In the multi-layer structure of the heat-resistant Ni-alloy composite according to the present invention, the $NiAl_3$ ($+Ni_2Al_3$) changes to the β phase during the subsequent heat treatment or a high-temperature operation. Since the interlayer is unstable, it changes to the inner layer composed of the α-Cr phase. The layer composed of the α-Cr phase functions as a diffusion barrier. The α-Cr phase exhibits a low Al solubility and has a small diffusion coefficient.

Compounds coexisting with a liquid Al phase in a high temperature are $NiAl_3$ of a Ni—Al system and $Cr_5Al_8$ of a Cr—Al system as is illustrated by a ternary phase-diagram for the Ni—Cr—Al system (FIG. 1). $NiAl_3$ may be replaced with $Ni_2Al_3$ as a consequence of diffusion.

When Al is diffused into a Ni layer formed by plating, the Ni layer surface changes to γ-Ni(Al), γ'-$Ni_3Al$, β-NiAl, $Ni_2Al_3$, and then $NiAl_3$ in this order.

The Ni alloy subjected to the Al-diffusing treatment is heated to a high temperature exceeding 750° C. The heating atmosphere may be either an inert gas or air. When the Ni alloy is heated above 750° C., Al diffuses toward the substrate and Ni diffuses toward the outer layer. Part of the Cr diffuses toward the outer layer. Since the diffusion of Cr is generally slower than the diffusion of Al and Ni, the diffusion of Ni toward the outer layer and diffusion of Al toward the inner layer occur. In other words, the outer layer changes from a $NiAl_3$ ($+Ni_2Al_3$) phase to a β phase containing dissolved Cr (Ni—Al—Cr). At the same time, Al diffuses from the surface of the substrate into the inside and the Al content in the substrate surface reaches a saturated level in the γ-Ni(Cr) phase.

When Cr in the β phase (Ni—Al—Cr) exceeds the saturated content (about 10 atomic percent), Cr precipitates in the form of the α-Cr phase. Namely, in the phase diagram of the Ni—Cr—Al system, the β phase (Ni—Al—Cr) is connected to the α-Cr phase with tie lines, and the α-Cr phase is connected to the γ phase (Ni(Cr, Al)) with tie lines. Consequently, the α-Cr phase must be present between the β phase and the γ phase.

In the heat-resistant Ni-alloy composite having the inner layer and the outer layer, each element has a content distribution across the thickness of the surface coat portion as shown in FIG. 3. Diffused Al before the generation of the inner layer is detected in the substrate, but the Al content in the inner layer is very low. When the heat-resistant Ni-alloy composite is left in a high-temperature oxidizing atmosphere for a long period of time, Ni diffuses from the substrate to the outer layer. Thus, the Cr in the substrate surface is concentrated and the thickness of the inner layer composed of the α-Cr phase increases.

Therefore, the inner layer maintains a low Al content and the outer layer maintains an Al content of at least 25 atomic percent. The content distribution shown in FIG. 3 is a result of the α-Cr phase in the inner layer functioning as a diffusion-barrier layer, and suppresses the diffusion of substrate components to the outer layer and the diffusion of Al from the outer layer to the substrate. After the passage of time, the phase of the outer layer changes from the β phase to the γ' phase, then γ phase. It is likely that the α-Cr phase disappears in the process of the change from the γ' phase to the γ phase.

Since the inner layer functions as the diffusion-barrier layer, the outer layer maintains a high Al content without dilution by the substrate components. Therefore, the outer layer functions as an Al source for the protective $Al_2O_3$ film. When the $Al_2O_3$ film is damaged during operation, $Al_2O_3$ is generated and the defective portion of the film is self-regenerated. The critical Al content in the substrate surface required for self-regeneration of the protective $Al_2O_3$ film is about 20 atomic percent in the Ni—Al alloy and about 10 atomic percent in the Ni—Cr—Al alloy. The required critical content varies depending on the type of the substrate alloy, but the Al content in the outer layer is sufficiently maintained above the critical Al content by the inner layer functioning as the diffusion-barrier layer.

The heat-resistant Ni-alloy composite having the surface coat is prevented from high-temperature corrosion and abnormal oxidization, and maintains the original excellent high-temperature characteristics of heat-resistant Ni-based alloys and Ni-based superalloys. The material fully satisfies the characteristics required in high-temperature applications such as gas turbines and jet engines, which tend to raise the operating temperature as a result of operating at high power.

BEST MODE FOR CARRYING OUT THE INVENTION

Figure 1:
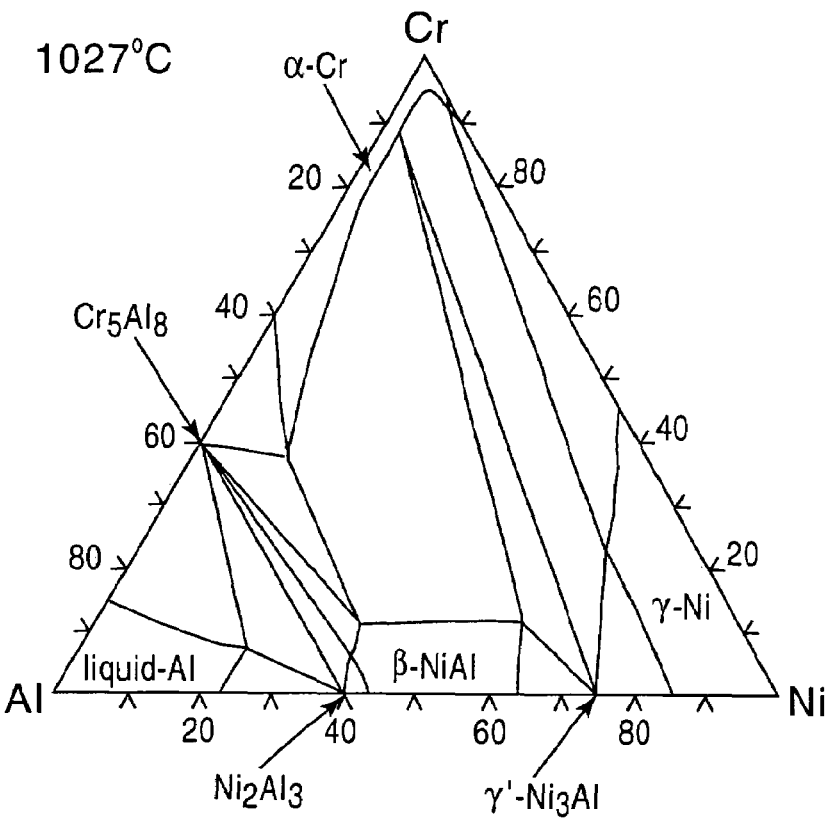
FIG. 1 is a ternary phase-diagram for a Ni—Cr—Al system.

Heat-resistant Ni-alloys used as a substrate are heat-resistant Ni-based alloys, Ni-based superalloys, Ni-20 Cr (atomic %) alloys used as heating elements or the like, other Ni—Cr-based alloys, and the like. In order to form the inner layer functioning as the diffusion-barrier layer, it is preferable that the Cr content in the surface coat of the substrate be at least 20 atomic percent. The lifetime of the α-Cr phase depends on the operating temperature and hours, and the α-Cr phase can be formed and maintained in a high temperature for a long period of time as the Cr content in the alloy increases. When the composite is used in a high-temperature exceeding 1,000° C., it is preferable that the Cr content be at least 35 atomic percent.

When a Ni—Cr-based alloy having a Cr content of 20 atomic percent or more is used as the substrate, or a Cr-containing layer is formed on a Ni-alloy surface in advance, the Cr content in the surface coat of the substrate can be maintained at at least 20 atomic percent, preferably at at least 35 atomic percent. The Cr-containing layer can be formed by pack cementation, electroplating, thermal spraying, physical vapor deposition (PVD), CVD, sputtering, or the like.

When a multicomponent Ni—Cr-based alloy containing alloying elements other than Cr, for example, Ni-4Cr-1W alloy is used, the structure of the layer is the same as that of the Ni-40Cr alloy but W is dissolved in the α-Cr phase by 3 atomic percent during heating at 1,100° C. It is likely that the Al content dissolved in the α-Cr phase decreases from 0.3 atomic percent in the Ni-40Cr alloy to 0.1 atomic percent in the Ni-4Cr-1W alloy, consequently, the diffusion capability of Al further decreases.

In the pack cementation, the Cr-containing layer is formed by penetration of Cr into the substrate. When the Cr-containing layer is formed by electroplating, thermal spraying, PVD, CVD, sputtering, or the like, it is preferable that Cr be diffused from the Cr-containing layer toward the substrate by the subsequent heat treatment.

When the Cr content in the surface coat is high, it is preferable that a Ni layer be formed on the Cr-containing layer by electroplating, thermal spraying, PVD, CVD, sputtering, or the like. When a Ni—Cr layer is formed instead of the Ni layer, the process for forming the Cr-containing layer on the substrate surface is not necessary. When a Ni—Al layer is formed, the formation of an Al layer in the subsequent Al-diffusing treatment is not necessary. It is preferable that amounts of deposited Ni in the Ni layer, the Ni—Cr layer, the Ni—Al layer, and the like be 100 g/m² to 200 g/m² to form the outer layer having a required thickness.

Then, Al-diffusing treatment is carried out under a high-activity Al condition. The substrate is buried in a mixed powder of Al, NH$_4$Cl, and Al$_2$O$_3$ having a ratio of 15:2:83 by weight, or is heated after the formation of the Al layer or the Ni—Al layer by plating. The Al-diffusing treatment is carried out by, for example, heating the Al layer formed by Al pack cementation, electroplating from a molten salt bath or a non aqueous plating bath, PVD, CVD, sputtering, or the like.

In the Al pack cementation, a Ni-alloy substrate is buried in a mixed powder of Al, NH$_4$Cl, and Al$_2$O$_3$ and heated in a non-oxidation atmosphere such as a vacuum, inert gas, or hydrogen gas at 800° C. to 1,000° C. for 1 hour to 10 hours, to diffuse Al into the Ni layer or the Ni—Cr layer. When the Al layer formed by electroplating from a molten salt bath or a non aqueous plating bath, PVD, CVD, sputtering, or the like is heated under the same condition as above, Al diffuses from the Al layer to the Ni layer or the Ni—Cr layer.

When the Ni alloy subjected to Al-diffusing treatment is left in a high-temperature oxidizing atmosphere exceeding 850° C., Al diffuses into the substrate and Ni diffuses from the substrate into the outer layer. As a result, the NiAl$_3$ (+Ni$_2$Al$_3$) phase of the outer layer changes to the β phase (Ni—Al—Cr). At the same time, the inner layer composed of an α-Cr phase is formed. After the formation of the inner layer, the diffusion of Al from the outer layer to the substrate is suppressed, so that the Al content in the outer layer is maintained at 20 atomic percent or more. A homogeneous layer is not formed between the inner layer composed of the α-Cr phase and the outer layer, so that the inner layer still functions as the diffusion-barrier layer.

The thickness of the inner layer is not limited. Since the capability of the diffusion-barrier layer is proportional to the square of the thickness, a thicker layer is advantageous. The inner layer composed of the α-Cr phase needs a thickness of at least 3 μm in order to achieve continuity of the layer. The outer layer needs an Al content of at least 25 atomic percent in order to have a protecting function. A thicker layer, preferably of 20 μm or more, is advantageous. The content of Al and the thickness of the layer are controlled by the Al-diffusing treatment.

EXAMPLE

Example 1

A Ni—Cr alloy containing Cr at 40 atomic percent was used as a substrate. The Ni—Cr alloy was soaked in a Ni-plating solution containing 1.25 mol/l NiSO$_4$, 0.19 mol/l NiCl$_2$, and 0.65 mol/l HBO$_3$ and plated at a current density of 5.5 mA/cm² for 3.5 hours. A Ni layer having a thickness of 18 μm to 20 μm was formed on the surface of the Ni—Cr alloy. Then, the Ni—Cr alloy substrate was buried in a mixed powder of Al:NH$_4$Cl:Al$_2$O$_3$=15:2:83 (mass ratio) and heated in an inert gas (argon) atmosphere at 800° C. for 2 hours for Al-diffusing treatment.

Figure 2:
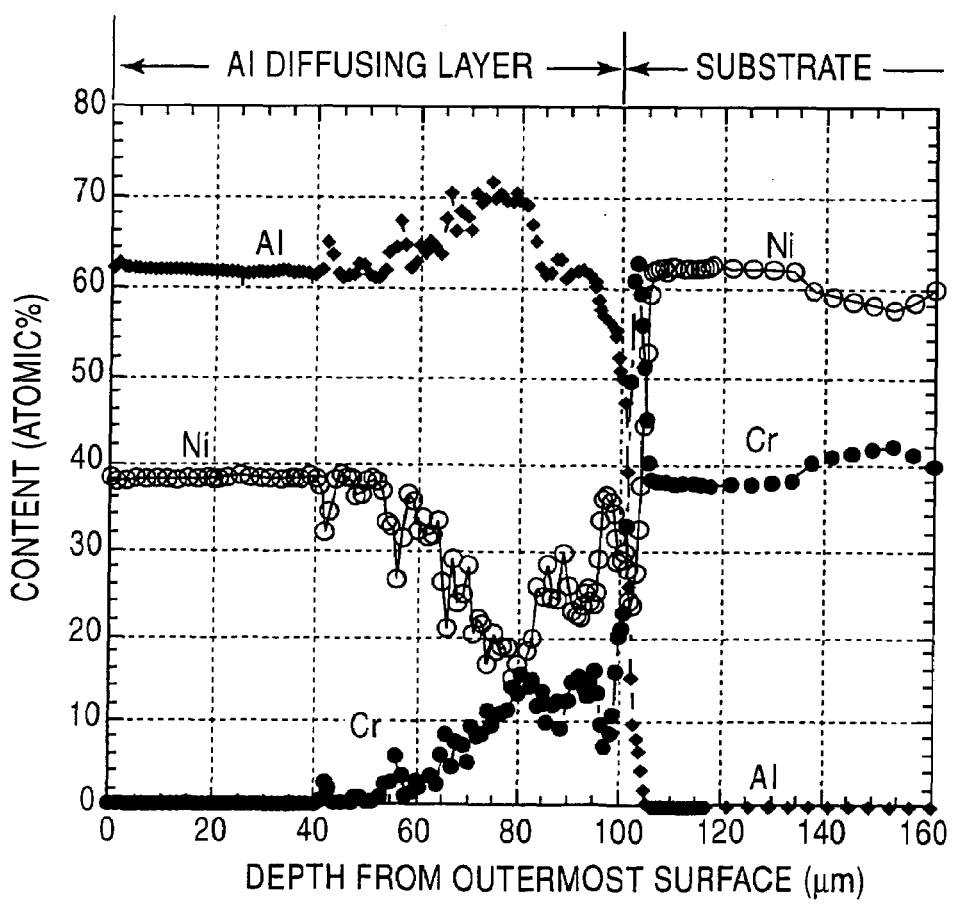
FIG. 2 is a graph showing the content distribution of each element across the thickness of the surface coat portion of a heat-resistant Ni-alloy composite immediately after an Al-diffusing treatment in example 1.

The content distribution of the elements across the thickness of the surface coat of the substrate subjected to the Al-diffusing treatment was measured. The result, as shown in FIG. 2, showed that the Cr content continuously decreased from the substrate surface toward the surface coat surface, and the Ni content continuously increased from the substrate to the Al-diffusing layer partway and then became constant toward the surface coat surface. The Al content in the inner side was higher than that in the outer side of the Al-diffusing layer.

Figure 3:
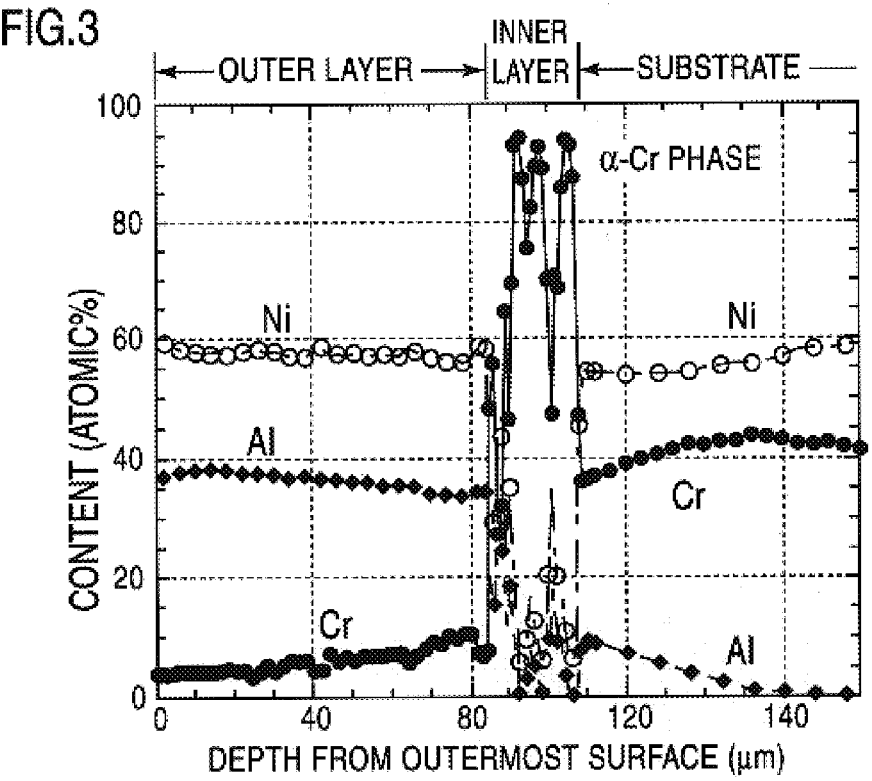
FIG. 3 is a graph showing the content distribution of each element across the thickness of the surface coat portion of the heat-resistant Ni-alloy composite after heating at 1,100° C. for 16 hours in air in example 1.

The Ni—Cr alloy subjected to the Al-diffusing treatment was heated in air at 1,100° C. for 16 hours. The content distribution of each element from the substrate changed as shown in FIG. 3. FIG. 3 shows that Al content in the outer layer is homogeneous. FIG. 3 also shows that inner layer has Cr content of about 85 atomic percent to about 95 atomic percent. It is clear from the comparison between FIG. 2 and FIG. 3 that a discontinuous content distribution of Al across the thickness was generated after the heat treatment and that Al was not contained in the region having a high Cr content.

Figure 4:
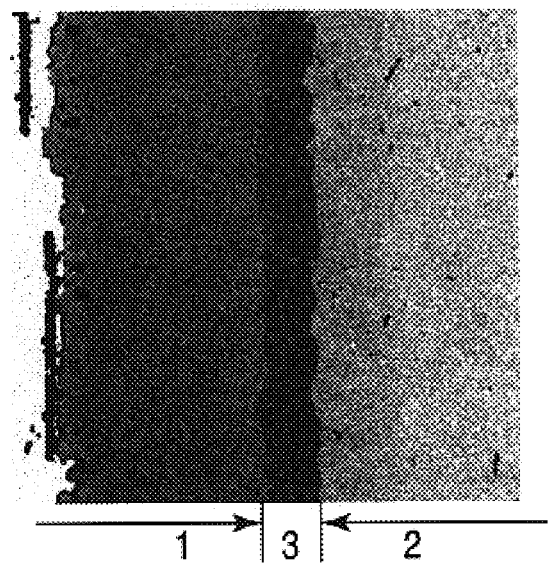
FIG. 4 is a micrograph showing a cross sectional structure of the surface coat portion having the inner layer composed of the α-Cr phase in example 1.

Microscopy demonstrated that the surface coat of the Ni—Cr alloy subjected to the Al-diffusing treatment had discontinuity in terms of Al content distribution across the thickness of the cross section. In the micrograph (×300) of the texture (FIG. 4), an inner layer 3 was observed between the substrate 2 and an outer layer 1, and clear boundaries were observed between the substrate 2 and the inner layer 3 and between the inner layer 3 and the outer layer 1. The inner layer 3 had an average thickness of 20 µm. An electron probe microanalysis (EPMA) showed that the inner layer was composed of an α-Cr phase. The outer layer 1 had an average thickness of 80 µm and was composed of a β phase (Ni—Al—Cr) containing about 37 atomic percent of Al.

Figure 5:
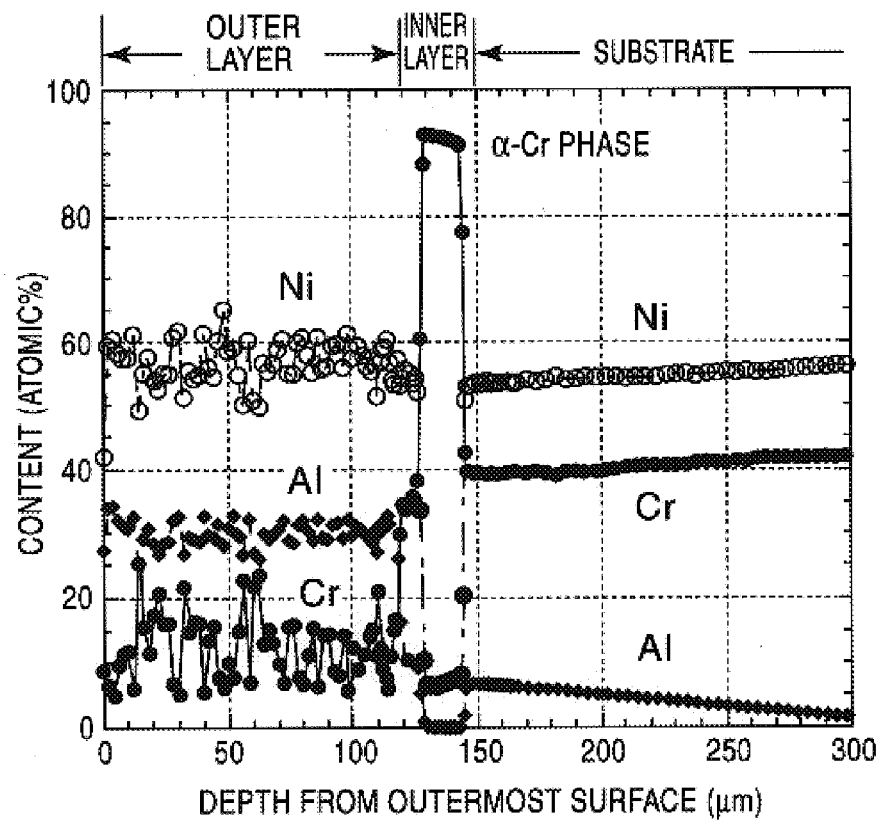
FIG. 5 is a graph showing the content distribution of each element across the thickness of the surface coat portion of the heat-resistant Ni-alloy composite after heating at 1,100° C. for 169 hours in air in example 1.
Figure 6:
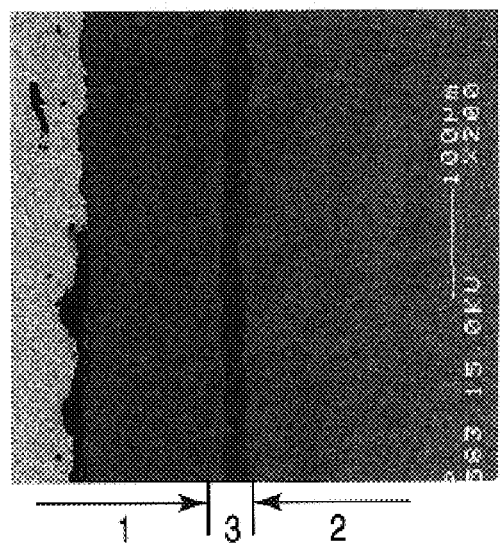
FIG. 6 is a micrograph showing a structure of the inner layer composed of the α-Cr phase in a cross section of the surface coat portion of the heat-resistant Ni-alloy composite after heating at 1,100° C. for 169 hours in air in example 1.

The Ni—Cr alloy having the inner layer 3 composed of the α-Cr phase did not substantially change the content distribution of each element across the thickness even when the alloy was heated at a high temperature for a long period of time. For example, the content distribution across the thickness after heating for 169 hours under the same conditions showed that the discontinuous portion remained in the Al content distribution across the thickness (FIG. 5) and the inner layer 3 composed of the α-Cr phase was observed at the discontinuous portion (FIG. 6). The Al content at the outer layer 1 was about 30 atomic percent. Consequently, a sufficient content of Al necessary for forming the protective $Al_2O_3$ layer was retained.

INDUSTRIAL APPLICABILITY

As described above, the heat-resistant Ni-alloy composite according to the present invention has a surface coat having a multi-layer structure including an inner layer composed of an α-Cr phase and an outer layer composed of a β phase (Ni—Al—Cr) and a λ' phase (Ni₃Al(Cr)) on a Ni alloy surface. Since the inner layer functions as a diffusion-barrier layer that prevents the diffusion of substrate components from the substrate into the outer layer and the diffusion of Al from the outer layer to the substrate, Al in the outer layer is not diluted with the substrate components. Consequently, an Al content required for forming the protective $Al_2O_3$ layer is ensured in the outer layer. When the $Al_2O_3$ layer is damaged under an operating condition, the defective portion of the layer is self-regenerated by Al supplied from the outer layer.

Therefore, high-temperature corrosion and abnormal oxidization are suppressed and the original excellent high-temperature characteristics of Ni alloys are maintained. A composite suitable for applications at a high-temperature such as gas turbines, jet engines, and elements for exhaust-gas systems is provided.

The invention claimed is:

1. A heat-resistant Ni-alloy composite having excellent high-temperature oxidation resistance, comprising:
   a Ni-alloy substrate containing Cr and
   a multi-layer surface structure formed on the Ni-alloy substrate, comprising
      an inner Cr layer with Cr content of about 85 atomic percent to about 95 atomic percent in the form of α-Cr phase composed of precipitates between the substrate and an outer layer and
      the outer layer composed of a β phase (Ni—Al—Cr) and a γ' phase (Ni₃Al(Cr)), wherein the Al content in the outer layer is homogeneous and is at least 20 atomic percent, and the Cr content in the outer layer is saturated,
      wherein said multi-layer surface structure is formed by diffusing Al in a NiAl₃ with Ni₂Al₃ layer formed on the Ni-alloy substrate containing Cr.

2. The heat-resistant Ni-alloy composite according to claim 1, wherein the Ni-alloy substrate comprises a heat-resistant Ni-based alloy or a Ni-based superalloy.

3. The heat-resistant Ni-alloy composite according to claim 1, wherein the Ni-alloy substrate comprises a Ni—Cr-based alloy having a Cr content of at least 20 atomic percent.

4. A heat-resistant Ni-alloy composite having excellent high-temperature oxidation resistance, comprising:
   a Ni-alloy substrate and
   a multi-layer surface structure formed on the Ni-alloy substrate, comprising
      an inner Cr layer with Cr content of about 85 atomic percent to about 95 atomic percent in the form of α-Cr phase composed of precipitates between the substrate and an outer layer and
      the outer layer composed of a β phase (Ni—Al—Cr) and a β' phase (Ni₃Al(Cr)), wherein the Al content in the outer layer is homogeneous and is at least 20 atomic percent, and the Cr content in the outer layer is saturated,
      wherein said multi-layer surface structure is formed by diffusing Al in a NiAl₃ (with Ni₂Al₃) layer formed on a Cr-containing layer coated on the Ni alloy substrate.

5. The heat-resistant Ni-alloy composite according to claim 4, wherein the Cr-containing layer is a Ni—Cr-based alloy layer.

6. The heat-resistant Ni-alloy composite according to claim 4 and 5, wherein the Cr-containing layer has a Cr content of at least 20 atomic percent.

* * * * *